(12) United States Patent
Anschutz et al.

(10) Patent No.: US 8,514,871 B2
(45) Date of Patent: Aug. 20, 2013

(54) METHODS, SYSTEMS, AND COMPUTER PROGRAM PRODUCTS FOR MARKING DATA PACKETS BASED ON CONTENT THEREOF

(75) Inventors: Thomas Arnold Anschutz, Conyers, GA (US); Edgar Vaughan Shrum, Jr., Smyrna, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 501 days.

(21) Appl. No.: 11/491,859

(22) Filed: Jul. 24, 2006

(65) Prior Publication Data

US 2008/0019371 A1    Jan. 24, 2008

(51) Int. Cl.
*H04L 12/28* (2006.01)
*H04L 12/56* (2006.01)

(52) U.S. Cl.
USPC .......................... 370/412; 370/235; 370/468

(58) Field of Classification Search
USPC ........................................................ 370/235
See application file for complete search history.

(56) References Cited

U.S. PATENT DOCUMENTS

| | | | | |
|---|---|---|---|---|
| 6,205,150 B1 * | 3/2001 | Ruszczyk | ...................... | 370/412 |
| 6,222,841 B1 * | 4/2001 | Taniguchi | ...................... | 370/389 |
| 6,381,649 B1 * | 4/2002 | Carlson | ......................... | 709/235 |
| 7,006,440 B2 | 2/2006 | Agrawal et al. | | |
| 7,114,002 B1 * | 9/2006 | Okumura et al. | ............. | 709/232 |
| 7,320,037 B1 * | 1/2008 | Maturi et al. | ................. | 709/236 |
| 2001/0036157 A1 * | 11/2001 | Blanc et al. | .................... | 370/235 |
| 2003/0112814 A1 | 6/2003 | Modali et al. | | |
| 2004/0085964 A1 * | 5/2004 | Vaananen | ................... | 370/395.4 |
| 2005/0163048 A1 * | 7/2005 | Arora et al. | ..................... | 370/230 |
| 2006/0164978 A1 * | 7/2006 | Werner et al. | ................ | 370/229 |
| 2006/0174035 A1 * | 8/2006 | Tufail | .......................... | 709/239 |
| 2010/0091676 A1 * | 4/2010 | Moran et al. | ................... | 370/252 |

OTHER PUBLICATIONS

Chen et al. "Network Architecture to Support QoS in Mobile Ad Hoc Networks", *Dept. Elec. and Comp. Eng. Univ. of Rochester*, NY pp. 1-4.
G. Jin "Packet Drop Avoidance for High-speed Network Transmission Protocol", *Distributed Systems Dept. Lawrence Berkeley Nat. Lab.* pp. 1-5.
"Digital Video Broadcasting (DVB); Transport of MPEG-2 Based DVB Services over IP Based Networks", *ETSI TS 102 034* v1.1.1 pp. 1-91 (2005).

\* cited by examiner

*Primary Examiner* — Jae Y Lee
(74) *Attorney, Agent, or Firm* — Myers Bigel Sibley & Sajovec, P.A.

(57) ABSTRACT

A method of encoding data for distribution over a network includes determining a relative importance of content of a data packet associated with a predetermined class-of-service as compared to content of other data packets associated with the predetermined class-of-service. The data packet is marked to indicate the relative importance of the content thereof within the predetermined class-of-service. For example, based on the information contained in the data packet, the data packet may be marked as discard-eligible. The data packet is selectively discarded based on the marking thereof. Related methods, systems, and devices are also discussed.

6 Claims, 5 Drawing Sheets

METHODS, SYSTEMS, AND COMPUTER PROGRAM PRODUCTS FOR MARKING DATA PACKETS BASED ON CONTENT THEREOF

FIELD OF THE INVENTION

The present invention relates to communications networks, and, more particularly, to the distribution of data packets over communications networks.

BACKGROUND OF THE INVENTION

Communications networks are widely used for nationwide and worldwide communication of voice, multimedia and/or data. As used herein, communications networks include public communications networks, such as the Public-Switched Telephone Network (PSTN), terrestrial and/or satellite cellular networks, and/or the Internet.

Current network technology may provide communication services using packet technology. Packetization is the breaking-up of a data file and/or continuous stream of data into discrete segments. As such, a packet may include a relatively small portion of the data, which may be transmitted as a single unit from a source node on a network to a destination node on the network. The packet may include the data as well as addressing, routing, and/or reliability information in the form of headers and/or trailers to enable the network's communication protocols to deliver the data within the packet to the intended recipient, and to ensure that the data arrives intact and/or without corruption. Breaking communications into packets may also allow the same data path to be shared among many users in the network. Such use, however, may result in network congestion and resultant delays in receipt of communications. For example, network traffic may fill input queues in destination systems faster than processing mechanisms can distribute the content, which may thereby cause a bottleneck in the communication process.

It is known to utilize various methods of traffic management in an attempt to alleviate bottlenecks of this kind. For example, multiple transmit queues may be made available in order to provide enhanced quality of service ("QoS") based on the preferential treatment of some packets over others. More particularly, queues of varying priority levels (e.g., one queue per priority level) may be provided into which packets may be stored while awaiting transmission on a network. For example, voice and/or video traffic may be sensitive to network delays, and as such, may be assigned to a higher priority queue than other data. Many network communication protocols, such as the Internet Protocol (IP), may provide the capability to specify a priority for a packet as a part of an IP header. Providing queues of varying priority levels may enable the network adapter to transmit higher priority packets before lower priority packets, even though the higher priority packets may have been queued subsequent to the lower priority packets.

SUMMARY OF THE INVENTION

According to some embodiments of the present invention, a method of encoding data packets for distribution over a network includes determining a relative importance of content of a data packet associated with a predetermined class-of-service as compared to content of other data packets associated with the predetermined class-of-service. The data packet is marked to indicate the relative importance of the content thereof within the predetermined class-of-service. For example, the data packet may include a header section and a payload section, and the relative importance of the content of the payload section may be determined. As such, a marker may be provided in the header section of the data packet to indicate the relative importance of the content of the payload section within the predetermined class-of-service.

In some embodiments, the relative importance of the content of the data packet may be determined based on an amount of information carried in the payload section and/or based on particular information contained in the payload section.

In other embodiments, the data packet may be marked as discard-eligible based on the relative importance of the content thereof. More particularly, the relative importance of the content of the data packet may be determined based on whether a file and/or data stream associated with the packet can be presented at a predetermined level of quality by a destination device coupled to the network if the data packet is not received by a receiver thereof. As such, the data packet may be marked as discard-eligible when the file and/or data stream can be presented at the predetermined level of quality if the data packet is not received by the receiver.

In some embodiments, the data stream may be a real-time data stream including voice data (such as IP telephony data), audio/video data (such as streaming multimedia data and/or video teleconferencing data), and/or interactive gaming data.

In other embodiments, the data packet may be marked with a specific level of discard-eligibility based on the relative importance of the content thereof as compared to the content of the other data packets associated with the predetermined class-of-service.

In some embodiments, the file and/or data stream may be an MPEG-encoded video stream. As such, the data packet may be marked as discard-eligible when the content of the data packet does not comprise an intra-coded (I) picture of the MPEG-encoded video stream. For example, the data packet may be marked as discard-eligible when the content of the data packet comprises a forward-predicted (P) picture and/or a bi-predictive (B) picture of the MPEG-encoded video stream. In addition, the data packet may be marked at a higher level of discard-eligibility when the content of the data packet comprises a bi-predictive (B) picture of the MPEG-encoded video stream.

In other embodiments, the data packet may be selectively discarded based on the marking thereof indicating the relative importance of the content of the data packet.

In some embodiments, the header of the data packet may be marked at an Application Layer of the Open Systems Interconnection (OSI) Reference Model.

According to other embodiments of the present invention, a network device is provided that is configured to determine a relative importance of content of a data packet associated with a predetermined class-of-service as compared to content of other data packets associated with the predetermined class-of-service. The network device is further configured to mark the data packet to indicate the relative importance of the content thereof within the predetermined class-of-service. For example, the network device may be an encoder, a firewall, gateway, and/or deep packet inspection (DPI) router.

According to further embodiments of the present invention, a method of encoding data packets for distribution over a network includes determining information contained in a data packet. Based on the information contained in the data packet, the data packet is marked as discard-eligible. For example, in some embodiments, the information contained in the data packet may be a portion of an associated file and/or data stream. As such, an importance of the data packet to rendering the associated file and/or data stream at a destination device may be determined based on the information contained therein, and the data packet may be marked as discard-eligible based on the importance thereof.

In some embodiments, the data packet may be marked with a specific level of discard-eligibility based on a relative importance thereof as compared to other data packets associated with the file and/or data stream. For example, the data stream may be an MPEG-encoded video stream, and a data packet containing a bi-predictive (B) picture of the MPEG encoded video stream may be marked with a higher level of discard-eligibility than a data packet that does not contain a bi-predictive (B) picture, such as data packets containing intra-coded (I) pictures and/or data packets containing only forward-predicted (P) pictures of the MPEG encoded video stream.

In other embodiments, the data packet may be associated with a predetermined class-of-service. The data packet may be marked with a specific level of discard-eligibility based on the relative importance thereof as compared to other data packets associated with the predetermined class-of-service.

In some embodiments, the data packet may be selectively discarded based on the marking thereof indicating the relative importance of the information contained therein.

According to still other embodiments of the present invention, a method of distributing data packets over a network includes selectively discarding a data packet associated with a predetermined class-of-service based on a marking thereof. The marking indicates a relative importance of content of the data packet as compared to content of other data packets associated with the predetermined class-of-service.

In some embodiments, the data packet may be selectively discarded from a queue corresponding to the predetermined class-of-service based on the marking thereof. More particularly, the data packet may be selectively discarded based on the marking thereof as compared to markings of other data packets stored in the queue and/or incoming data packets associated with the queue. For example, the data packet may be selectively discarded when a buffer of the queue is full and/or when network congestion exceeds a predetermined threshold.

In other embodiments, the data packet may be selectively discarded from a first queue based on the marking thereof as compared to markings of data packets stored in and/or incoming to a second queue. As such, bandwidth may be dynamically allocated to the second queue based on an available bandwidth in the first queue after selectively discarding the data packet from the first queue.

In some embodiments, the data packet may be selectively discarded based on a marking thereof indicating that the content of the data packet is discard-eligible. For example, the data packet may be selectively discarded based on the marking thereof indicating that the content thereof does not comprise an intra-coded (I) picture of a MPEG-encoded video stream. More particularly, the data packet may be selectively discarded based on the marking thereof indicating that the content of the data packet comprises a forward-predicted (P) picture and/or a bi-predictive (B) of the MPEG-encoded video stream.

In other embodiments, the data packet may be selectively discarded based on the marking thereof indicating a specific level of discard-eligibility based on a relative importance of the content of the data packet as compared to information contained in other data packets. For example, the data packet may be selectively discarded based on the marking thereof indicating a higher level of discard-eligibility when the content of the data packet comprises a B picture of the MPEG-encoded video stream.

In some embodiments, the data packet may be selectively discarded at a Network Layer of the Open Systems Interconnection (OSI) Reference Model based on the marking of a header thereof.

According to still further embodiments of the present invention, a network router device is provided that is configured to selectively discard a data packet associated with a predetermined class-of-service based on a marking thereof. The marking indicates a relative importance of content of the data packet as compared to content of other data packets associated with the predetermined class-of-service. In addition, the router may be configured to selectively discard the data present based on a marking thereof indicating that the data packet is discard-eligible.

Other methods, systems, devices, and/or computer program products according to other embodiments of the invention will become apparent to one with skill in the art upon review of the following drawings and detailed description. It is intended that all such additional methods, systems, devices, and/or computer program products be included within this description, be within the scope of the present invention, and be protected by the accompanying claims.

DETAILED DESCRIPTION OF EMBODIMENTS OF THE INVENTION

Specific exemplary embodiments of the invention will now be described with reference to the accompanying drawings. This invention may, however, be embodied in many different forms and should not be construed as limited to the embodiments set forth therein. Rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The present invention is described hereinafter with reference to flowchart and/or block diagram illustrations of systems, methods, and computer program products in accordance with some embodiments of the invention. These flowchart and/or block diagrams further illustrate exemplary operations of the system and device architectures of FIGS. 1 to 7. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: a portable computer diskette, a random access memory (RAM), a read-only memory (ROM), an erasable programmable read-only memory (EPROM or Flash memory), and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Computer program code for carrying out operations of systems, methods, and computer program products according to embodiments of the present invention discussed below may be written in a high level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

As used herein, the term "packet" may refer to a unit of information and/or a block of data that may be transmitted electronically as a whole or via segments from one device to another. Accordingly, as used herein, the term "packet" may encompass such terms of art as "frame" and/or "message," which may also be used to refer to a unit of transmission. In addition, as used herein, the term "multimedia device" may include any device that is capable of receiving and displaying audio and/or video content, and may include a television; a set-top box for a television; a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a personal computer (mobile or stationary) that includes a modem or other network transceiver. Also, "media services" or "multimedia content" may include audio and/or video content, applications and/or services.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and the relevant art, and will not be interpreted in an idealized or overly formal sense unless expressly so defined herein.

Some embodiments of the present invention may arise from a realization that when a router queue level exceeds a predetermined threshold, such as during periods of high network congestion, incoming packets of a corresponding priority level may be randomly dropped or discarded, which may negatively affect quality of service. For example, in order to render video data, such as an MPEG-encoded video stream, it may be necessary to receive and present packets in the correct order, with little or no packet loss, and with smooth, continuous timing, or else essential information may be missing. As such, the dropped packets may have to be retransmitted, which may result in inefficiency, distribution delays, and/or reduced service quality. Accordingly, rather than indiscriminately dropping data packets during periods of network congestion, it may be desirable for a network router to selectively drop data packets based on the importance of the data contained therein to a destination device that is configured to present a file associated with the data packet. Thus, some embodiments of the present invention provide methods, systems, and devices for prioritizing data packets based on an importance of the content of a data packet, for example, within a predetermined class-of-service. In addition, certain packets may be marked as discard-eligible based on the importance of the content of the data packet to the destination device.

Figure 1:
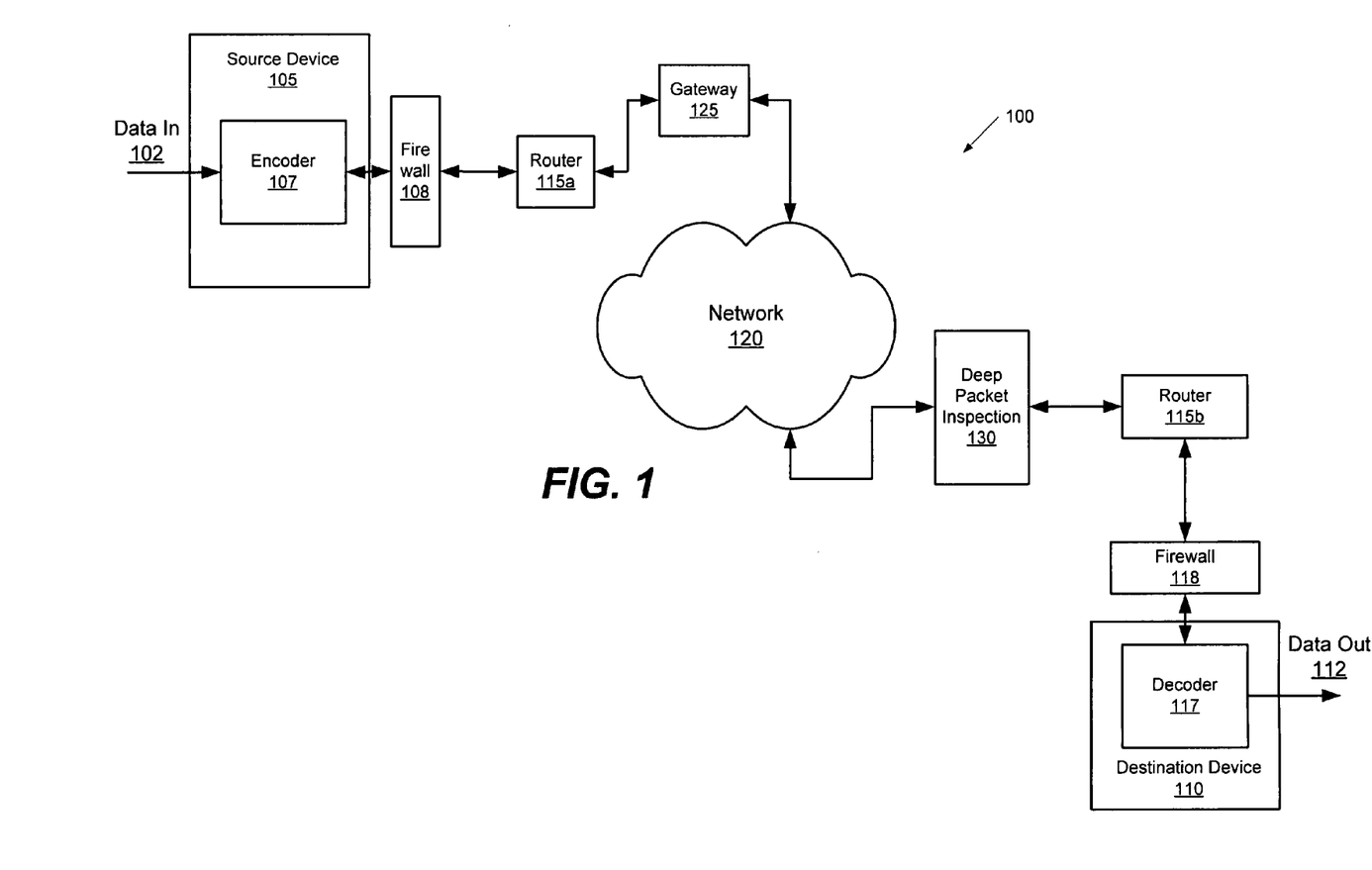
FIG. 1 is a block diagram that illustrates a system for packet distribution according to some embodiments of the present invention.

FIG. 1 is a block diagram illustrating systems, methods, and computer program products for packet distribution according to some embodiments of the present invention. Referring now to FIG. 1, a packet distribution system 100 includes a source device 105 that is configured to provide packetized data to a destination device 110 via one or more communications networks, such as network 120. For example, the source device 105 may be a multimedia service provider configured to provide multimedia services, such as digital telephone, digital cellular phone, internet, and/or digital television services to one or more destination devices, such as the destination device 110. Accordingly, the destination device 110 may be a multimedia device that is configured to decode and present the received packetized data to a user. For example, the source device 105 and the destination device 110 may be voice-over Internet Protocol (VoIP) enabled telephones configured to transmit and receive voice data therebetween over the network 120. As such, the destination device 110 and/or the source device 105 may also include a user interface (not shown) to present the received data. More generally, although termed as a source device 105 and a destination device 110 in FIG. 1, it is to be understood that the device 105 may be a destination device and the device 110 may be a source device according to some embodiments of the present invention.

The network 120 may represent a global network, such as the Internet, and/or other publicly accessible network. The network 120 may also, however, represent a wide area network, a local area network, an Intranet, and/or other private network, which may not accessible by the general public. Furthermore, the network 120 may represent a combination of one or more wired and/or wireless public and/or private networks and/or virtual private networks (VPN). The network 120 may be circuit-switched network, such as the Public-Switched Telephone Network (PSTN), and/or a packet-switched network, such as the Internet. More generally, the network 120 may be any network that is configured to distribute packetized data from the source device 105 to the destination device 110. For example, in some embodiments, the network 120 may be coupled to and/or may include an IP Multimedia Subsystem (IMS) network. IMS is a standard that has been developed to provide for control and integration of multimedia services in a packet-switched network. In particular, the IMS architecture defines a set of logical functions that use a signaling protocol, known as session initiation protocol (SIP), to setup, maintain, and terminate packet-switched voice and data. As such, an IMS network may provide a standardized way to connect IP devices and networks.

The source device 105 and the destination device 110 may be coupled to the network 120 by several other network devices. More particularly, as shown in FIG. 1, the source device 105 is connected to the network 120 via a firewall 108, a router 115a, and a gateway device 125. Similarly, the destination device 110 is connected to the network 120 via a firewall 118, a router 115b, and a deep-packet inspection device 130. As is well known in the art, the firewalls 108 and 118 may be configured to intercept, inspect, and/or block further distribution of packets traveling to or from an application to prevent unwanted outside traffic from reaching devices coupled thereto. The routers 115a and 115b may be configured to select appropriate paths in the network 120 for packet distribution and individually forward received data packets toward their destinations based on addressing and/or routing information contained in each data packet. The gateway device 125 may serve as an access point from one network to another; for example, the source device 105 may be part of local area network (LAN), while the network 120 may be a wide-area network (WAN), such as the Internet. The deep packet inspection device (DPI) 130 may be a routing device that is configured to examine the data contained in each received packet and search for predefined criteria to decide if the packet will be allowed to pass. More particularly, the deep packet inspection device 130 may be configured to examine information corresponding to Layers 2 through 7 of the Open Systems Interconnection (OSI) reference model, including packet headers and data paths. As such, the DPI 130 may redirect, mark/tag, block, and/or rate limit distribution of packets, and may report to a reporting agent in the network. The foregoing components of the packet distribution system 100 may be included in many conventional communication systems, and their functionality is generally known to those skilled in the art.

Still referring to FIG. 1, the source device 105 may be a media service provider configured to provide (or "serve") media content to one or more destination devices, such as the destination device 110 over the network 120. As such, different content may be transmitted to different devices, for example, with differing levels of priority. The source device 105 includes a transmitter (not shown) including an encoder 107 that is configured to convert input data 102 into packets, each labeled with a complete destination address, for distribution over the network 120. In addition, the source device 105 may also include an analog-to-digital converter (not shown) configured to digitize the input data 102 for packetization by the encoder 107. Similarly, the destination device 110 includes a receiver (not shown) including a decoder 117 that is configured to reassemble received data packets to provide the original file and/or data stream as output data 112 at the destination device 110. Although not shown, the destination device 110 may further include an digital-to-analog converter and a user interface configured to present the received file and/or data stream to a user.

The encoder 107 is further configured to determine the information contained in a data packet, for example, in terms of its importance to the destination device 110 in presenting and/or rendering the associated file and/or data stream. More particularly, the encoder 107 may be configured to examine the information contained in the payload section of a data packet, which carries data corresponding to a portion of the file and/or data stream, as opposed to the content of the header section. As described herein, the term "header" may be used to generally refer to an overhead section of a data packet, and as such, may refer to a header section included at the beginning of a packet and/or a trailer or footer section at the end of a packet. In addition, the encoder 107 is configured to determine a relative importance of the content of the data packet as compared to the content of other data packets associated with the same class-of-service.

As used herein, a class-of-service (CoS) may refer to a queuing discipline or way of managing traffic in a network by grouping similar types of traffic together and treating each type of traffic as a class with its own level of service priority. For example, delay-sensitive traffic, such as voice and/or streaming video, may be associated with a higher priority class then e-mail and/or less time-sensitive traffic. As such, class of service (CoS) may be used to differentiate high-priority traffic from lower-priority traffic. More particularly, an algorithm may compare fields of packets or CoS tags to classify packets and to assign to queues of differing priority. However, CoS may not ensure network performance or guarantee priority in delivering packets, in contrast to quality-of-service (QoS) functions. As used herein, QoS may refer to the performance attributes of an end-to-end connection, such as error rates, lost packet rates, throughput, and/or delays.

The encoder 107 is also configured to mark data packets based on the determined importance of the information contained therein. More particularly, the encoder 107 may be configured to provide a marked in the header section of the data packet to indicate the relative importance of the content thereof. For example, the marker may indicate the importance of the data packet relative to other data packets within the predetermined class-of-service. In addition, based on the content of the data packet, the encoder 107 may mark the data packet as being discard-eligible. As such, during "bursty" periods of high network congestion, the routers 115a and/or 115b can selectively discard data packets based on the marking thereof provided by the encoder 107. As discussed above, the marking may indicate a relative importance of the content of the data packet as compared to content of other data packets associated with the predetermined class-of-service. For example, certain packets may be marked as discard-eligible based on whether the file and/or data stream associated with the packet can be presented at a predetermined level of quality by the destination device 110 even if the data packet is not received at the decoder 117. Accordingly, if a packet must be dropped, the routers 115a and/or 115b may preferentially drop packets marked as discard-eligible first, improving the probability that data packets carrying more important data will be received at the destination device 110. Thus, the loss of those packets that may significantly degrade presentation of the file and/or data stream at the destination device 110 may be reduced and/or minimized.

Although FIG. 1 illustrates an exemplary communications network configured to distribute packetized data, it will be understood that the present invention is not limited to such configurations, but is intended to encompass any configuration capable of carrying out the operations described herein. For example, although described herein primarily with reference to the encoder 107, other network devices, such as the firewalls 108 and/or 118, the gateway device 125, and/or the deep packet inspection (DPI) device 130, may be configured to determine the information contained in a data packet and mark the data packet as described above. More generally, other network devices operating at the application layer (i.e., Layer 7 of OSI Model) with similar capabilities may be so configured in some embodiments of the present invention. Likewise, although described herein with reference to the routers 115a and 115b, other network devices operating at the network layer (i.e., Layer 3 of the OSI Model) may be configured to selectively discard data packets as described above. More generally, while particular blocks having particular functionalities are shown in FIG. 1 by way of illustration, functionalities of particular blocks thereof may be combined, divided, and/or eliminated.

Figure 2:
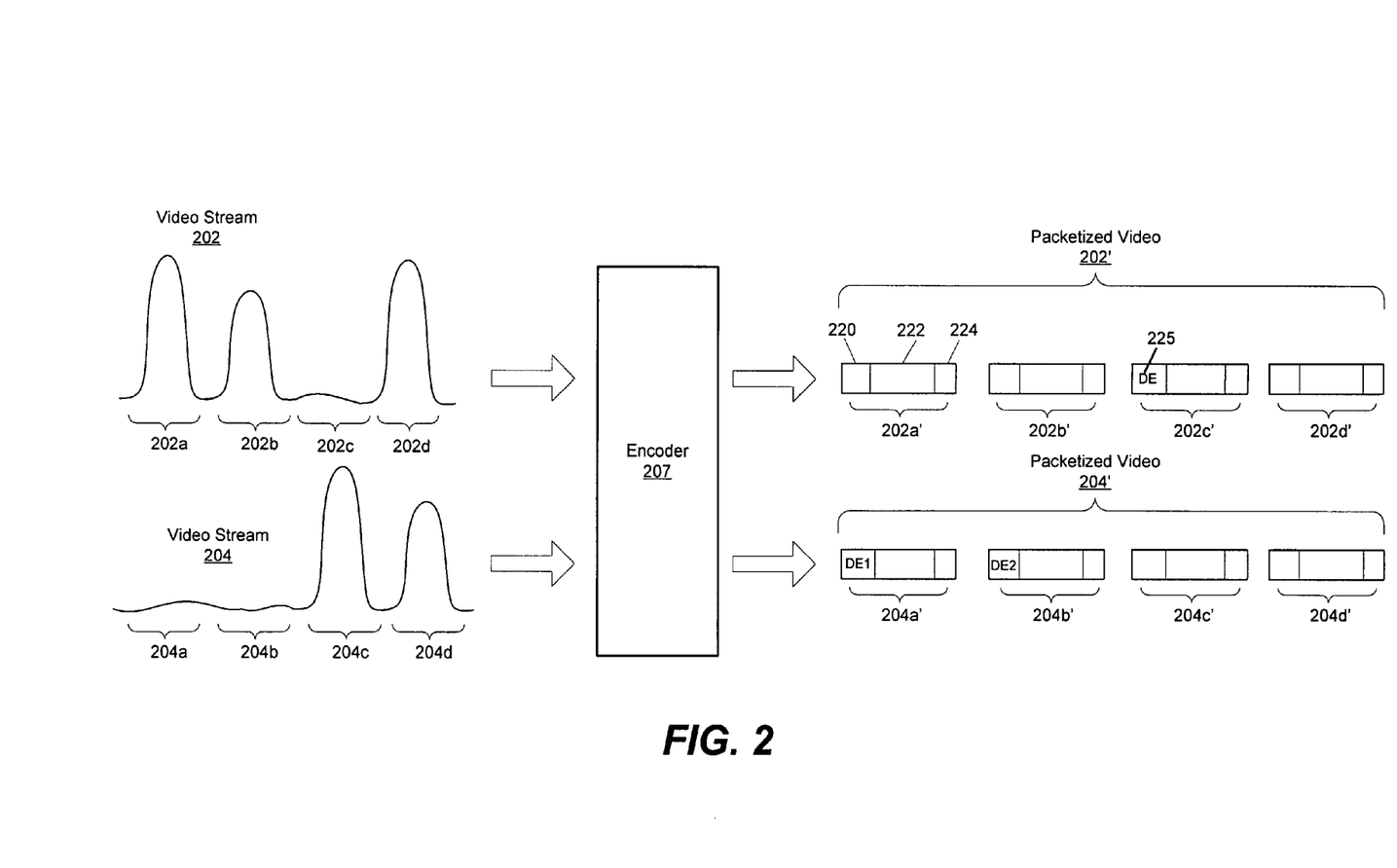
FIG. 2 is a block diagram illustrating an encoder configured to packetize data for distribution over a network according to some embodiments of the present invention.

FIG. 2 is a block diagram illustrating an encoder configured to packetize video data for distribution over a network according to some embodiments of the present invention. The encoder 207 may correspond to the encoder 107 of FIG. 1. As shown in FIG. 2, the encoder 207 is configured to convert first and second video streams 202 and 204 into packetized video data 202' and 204', respectively, for distribution over a network, such as the network 120 of FIG. 1. As such, the encoder 207 may also include an analog-to-digital converter configured to convert the analog video streams 202 and 204 into a digital format prior to packetization to provide the packetized video data 202' and 204'.

More particularly, the encoder 207 is configured to convert video streams 202 and 204 into a plurality of packets 202a'-202d' and 204a'-204d'. The packets 202a'-202d' respectively represent data corresponding to portions 202a-202d of the of video stream 202, and the packets 204a'-204d' respectively represent data corresponding to portions 204a-204d of the of video stream 204. Each of the data packets 202a'-202d' and 204a'-204d' may include a header section 220, a payload section 222, and a trailer section 224. The header section 220 typically includes information that may be used to route the packet from the source to the destination. The payload section 222 contains the data carried by the packet corresponding to a portion of the video stream. The trailer section 224 typically includes information related to reducing errors that may occur during transmission.

In addition, as shown in FIG. 2, the encoder 207 is configured to mark some of the packets 202a'-202d' and 204a'-204d' to indicate an importance of the content of the payload section 222 of the data packets 202a'-202d' and 204a'-204d'. As used herein, the importance of a data packet (and/or the content thereof) may refer to the ability of a receiver or other destination device to successfully decode and/or render a data stream associated with a particular data packet if that packet is lost, dropped, and/or otherwise not received by the destination device. For example, the relative importance of the data packets 202a'-202d' and 204a'-204d' may be determined by the encoder 207 based on an amount of information carried in the payload section 222 and/or based on particular information contained in the payload section 222 of each packet. More particularly, some of the data packets 202a'-202d' and 204a'-204d' may be marked as discard-eligible if a file and/or data stream associated with the packets can be presented at a predetermined level of quality (for example, without a significant degradation in the presentation of the file and/or data stream) by a destination device coupled to the network if the data packet is not received by a receiver (and/or a decoder) thereof. For example, the content of certain data packets may be non-essential for rendering and/or functionality of an associated file. Also, in some instances, the content of the data packet may be recovered based on other received data packets associated with the file and/or data stream if the packet is not received at the destination device.

For example, in video compression formats, such as video encoded according to the Moving Pictures Expert Group (MPEG) standard, video data can be rendered based on data representing only the differences between pictures, as there may typically be a great deal of commonality between one picture (or frame) of a video stream and the next. For example, in a scene in which a person walks past a stationary background, only the moving region may need to be represented (either as motion vectors or as image data or as a combination of the two, depending on which representation uses the fewest bits to adequately represent the picture), as the parts of the scene that are not changing need not be sent repeatedly. As such, scene changes in a video stream may contain a relatively large amount of picture data, and thus packets corresponding to portions of the video stream representing these scene changes may be of greater importance to a decoder at a destination device in rendering the video stream.

More particularly, in the case of MPEG-encoded video, the MPEG data includes three types of pictures: intra-coded (I) pictures, forward-predicted (P) pictures and bi-predictive (B) pictures. I-pictures may be coded without reference to any picture except itself, and as such, may be generated by an encoder to create a reference point to allow a decoder to decode other pictures based on the I-picture. A P-picture may be dependent on an I-picture, because it contains difference data obtained from the I-picture. A B-picture may be dependent on both P- and I-pictures. In other words, one whole image can be decoded by just an I-picture, since an I-picture is independent of the other two types of pictures. I-pictures therefore may typically require more bits to encode than other picture types. For example, a sequence may begin with an I-picture as an anchor, and the subsequent pictures may be described only by the way in which they differ from the previous picture. The I-picture and all pictures before the next I-picture may be referred to as a Group of Pictures (GOP). Within the GOP are a number of P-pictures and B-pictures. The first P-picture may be decoded using the I-picture as a basis, using motion compensation and adding difference data to shift pixels from the previous picture to produce the next picture. The next and subsequent P-pictures and/or B-pictures may be decoded using the previous P-picture as a basis. As such, in an MPEG-encoded video stream, the loss of a packet containing a P-picture or B-picture may merely present a disruption from which a receiver may recover based on the previously received pictures. However, the loss of a packet containing an I-picture may seriously affect the ability of the receiver to render the video stream.

Accordingly, still referring to FIG. 2, the encoder 207 is configured to mark certain data packets as discard-eligible (DE) based on the importance of the content of those packets. More particularly, the encoder 207 may provide a marker 225 or discard bit in the header section 220 of a data packet to indicate the importance of the content of the payload section 222 of the packet. As shown in FIG. 2, data packets 202c', 204a', and 204b' correspond to portions 202c, 204a, and 204b of the video streams 202 and 204. These portions 202c, 204a, and 204b contain relatively small amounts of data in comparison to portions 202a, 202b, 202d, 204c, and 204d. For example, the scenes of the video streams 202 and 204 represented by portions 202c, 204a, and 204b may be relatively static. As such, the data contained in corresponding packets 202c', 204a', and 204b' may be relatively unimportant to rendering of the video streams 202 and 204 at a destination device. Thus, packets 202c', 204a', and 204b' are marked as discard-eligible by providing a marker (DE) 225 in the header section 220 of each of the packets 202c', 204a', and 204b'. The markers (DE) may indicate to other network components, such as the routers 115a and 115b of FIG. 1, that the data packets 202c', 204a', and 204b' may be dropped, if necessary, without substantially affecting the presentation of the associated file and/or data stream at the destination device.

For example, when the data streams 202 and 204 are MPEG-encoded video streams, the data packets 202c', 204a', and 204b' that do not carry intra-coded (I) pictures of the MPEG-encoded video stream may be marked as discard-eligible (DE). More particularly, data packets containing forward-predicted (P) pictures and/or bi-predictive (B) pictures of the MPEG encoded video stream may be marked as discard-eligible. Conversely, in some embodiments, data packets containing intra-coded (I) pictures of the MPEG-encoded video stream may be marked as discard-ineligible. In addition, the encoder may be configured to mark the data packets 202c', 204a', and 204b' with a specific level of discard-eligibility, based on the relative importance of the content thereof. For example, when the data packet 204a' contains B-picture data and the data packet 204b' contains only P-picture data, the packet 204a' may be marked with a higher level of discard-eligibility (DE1) than the packet 204b' containing only the P-picture data (DE2) and/or other packets that contain I-picture data. In other words, the encoder 207 may be configured to mark the discard-eligible data packets to indicate a relative unimportance thereof. Also, although FIG. 2 illustrates packetized video data 202' and 204' corresponding to a same file type and associated with the same class-of-service, it is to be understood that the data packets may be marked with specific levels of discard-eligibility as compared to the content of other discard-eligible packets associated with other classes-of-service and/or other file types.

Although FIG. 2 illustrates an exemplary encoder according to some embodiments of the present invention, it will be understood that the present invention is not limited to such a configuration but is intended to encompass any configuration capable of carrying out the operations described herein. In addition, although illustrated with reference to video streams 202 and 204, it is to be understood that encoders according to some embodiments of the present invention may be configured to packetize other types of files and/or data streams including voice data (such as IP telephony data), audio/video data (such as streaming multimedia data and/or video teleconferencing data), and/or interactive gaming data. Moreover, although described above with reference to an encoder 207, it is to be understood that any application layer device (i.e., operating at Layer 3 of the Open Systems Interconnection (OSI) Reference Model) with similar capabilities may be configured to mark packets corresponding to any type of file and/or data stream where portions of the data may be relatively unimportant to a destination device as compared to other portions of the data.

Figure 3:
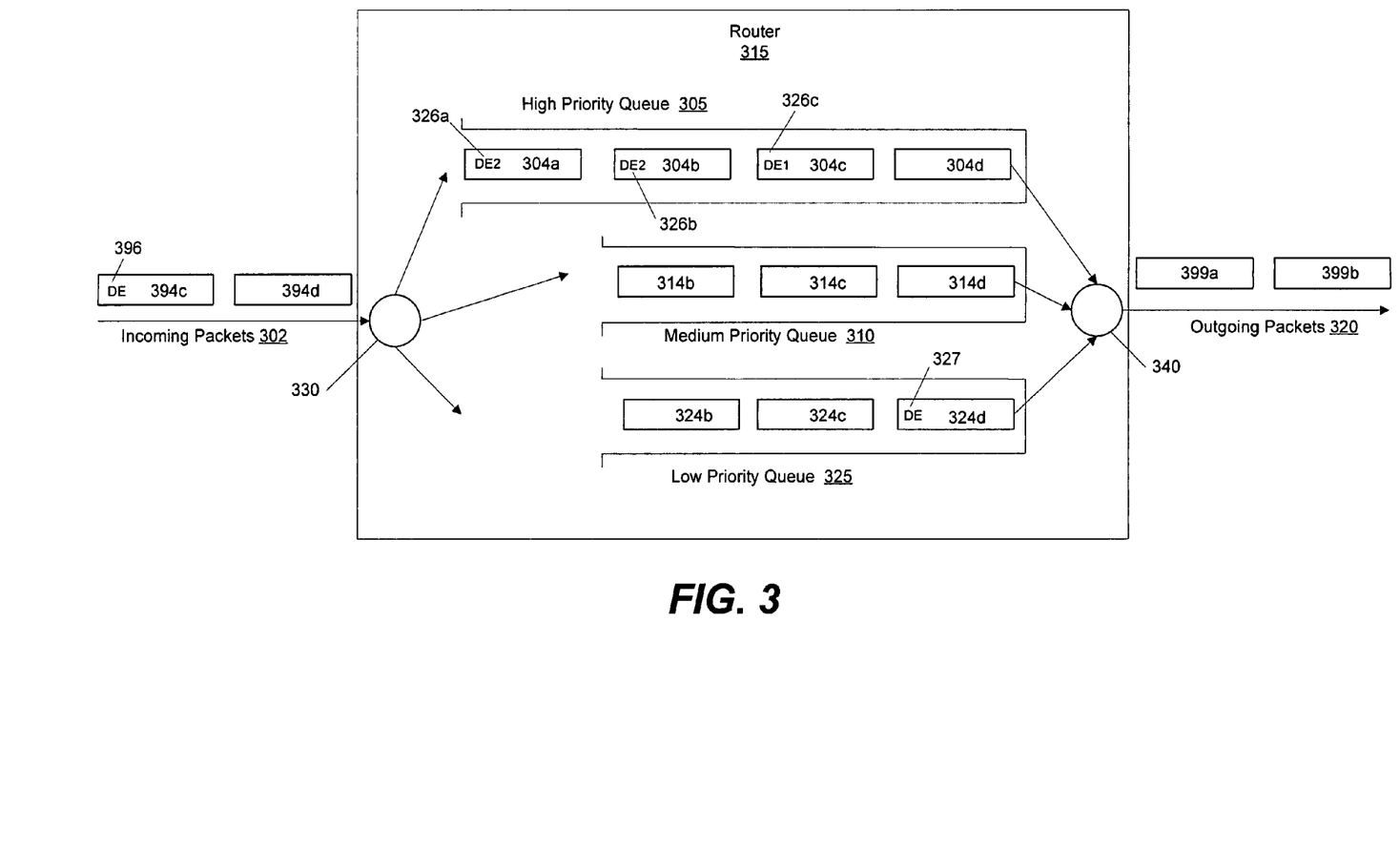
FIG. 3 is a block diagram illustrating packet queuing in a router according to some embodiments of the present invention.

FIG. 3 is a block diagram illustrating queuing in a router 315 according to some embodiments of the present invention. The router 315 may correspond to one or more of the routers 115a and/or 115b of the system 100 of FIG. 1. Referring now to FIG. 3, the router 315 includes a plurality of queues 305, 310, and 325 where incoming data packets 302 are stored, a classifier 330 configured to direct the incoming data packets 302 to one of the queues 305, 310, and 325 based on the priority associated with each of the incoming data packets 302, and a scheduler 340 configured to selectively output data packets from the queues 305, 310, and 325 as outgoing data packets 320. Each of the queues 305, 310, and 325 is configured to store data packets associated with a different class-of-service. In other words, each of the queues 305, 310, and 325 corresponds to a particular priority level. More particularly, the router 315 includes a high priority queue 305, a medium priority queue 310, and a low priority queue 325. For example, voice, video, and/or other delay-sensitive data, such as e-mail, may be stored in the high priority queue 305, while less delay-sensitive data may be stored in the lower priority queues 310 and 325. The buffer size of each queue determines the maximum number of packets that can be stored in each queue. For example, as shown in FIG. 3, the high priority queue 305 is allocated the greatest buffer size. More particularly, the high priority queue 305 is configured to store four data packets (currently, packets 304a-304d), and the medium and low priority queues 310 and 325 are each configured to store three packets (packets 314b-314d and 324b-324d, respectively). Packets in the low priority queue 325 may be output as outgoing packets 320 after the higher-priority queues 305 and 310 are empty.

Still referring to FIG. 3, the router 315 is configured to selectively discard data packets based on the markings thereof. As discussed above with reference to FIG. 2, the markings in the header section of the data packets may indicate the importance of the content of the data packet to a destination device. More specifically, the markings may indicate that the content of a data packet is discard-eligible, i.e., that a file and/or data stream associated with the packet may be rendered by a destination device even if the data packet is not received by the destination device. For example, as shown in FIG. 3, data packets 304a-304c in queue 305 and data packet 324d in queue 325 are marked as discard-eligible (DE) by markers 326a-326c and 327, respectively. In addition, incoming data packet 394c is also marked as discard-eligible (DE) by marker 396. Thus, based on the marking of each packet, the router 315 may determine the importance of the content of each data packet for reassembling and/or rendering a corresponding file and/or data stream at a destination device, such as the destination device 110 of FIG. 1.

Accordingly, the router 315 may be configured to selectively discard a data packet based on the marking indicating a relative importance of the content of the data packet as compared to content of other data packets associated with the same class-of-service. For example, the router 315 may selectively discard incoming packets when a buffer in the queue associated with a particular class-of-service is full and/or when network congestion exceeds a predetermined threshold. For instance, as shown in FIG. 3, high- and medium-priority queues 305 and 310 are currently full. As such, if incoming discard-eligible data packet 394c has a priority corresponding to queue 310, the router 315 may selectively discard data packet 394c. In addition, where data streams from multiple sources are transmitted, the router 315 may be configured to selectively discard packets marked as having a lower level of importance from one source to make room for packets marked as having a higher level of importance from another source.

Furthermore, the router 315 may be configured to selectively discard data packets from one or more of the queues 305, 310, and/or 325 based on the markings thereof as compared to markings of other data packets stored in the queues 305, 310, and/or 325 and/or incoming data packets associated with the queues 305, 310, and/or 325. For example, data packets 304a-304d stored in high-priority queue 305 may correspond to MPEG encoded video streams. As such, if data packets 304a, 304b, and 304c, do not carry intra-coded (I) pictures of the MPEG-encoded video stream, these packets may be marked as discard-eligible. Thus, if incoming data packet 394d has a priority corresponding to queue 305, the router 315 may selectively discard one of the data packets 304a-304c marked as discard-eligible from the queue 305 to make room for packet 394d.

Moreover, the router 315 may selectively discard one or more of the data packets 304a-304c from the queue 305 based on a specific level of discard eligibility indicated by the markings thereof. For example, one or more of the packets 304a-304c may be selectively discarded based on a relative amount of information (as compared to other packets) and/or particular information contained therein. More particularly, packet 304c may carry a bi-predictive (B) picture of the MPEG encoded video stream, while packets 304a and 304b may include forward-predicted (P) pictures. Accordingly, as shown in FIG. 3, the marking 326c of packet 304c indicates a higher level of discard-eligibility (DE1) than the markings 326a and 326b of discard-eligible packets 304a and/or 304b (DE2). Thus, as queue 305 is full, packet 304c may be selectively discarded, and incoming data packet 394d may be stored in the queue 305.

In addition, the router 315 may be configured to selectively discard the data packets from one of the queues 305, 310, and/or 325 based on the markings thereof as compared to the markings of data packets stored in and/or incoming to other ones of the queues 305, 310, and/or 325. For example, as shown in FIG. 3, medium priority queue 310 is completely filled by packets 314b-314d, none of which are marked as discard-eligible. As such, if incoming packet 394d has a priority associated with queue 310, the router 315 may be forced to discard the incoming packet 394d, as none of the packets 314b, 314c, 314d, and/or 394d have markings indicating a relative importance as compared to the others. However, as queues 305 and 325 contain packets 304a-304c and 324d marked as discard-eligible (DE), the router 315 may be configured to selectively discard one or more of these packets 304a-304c and 324d. For example, the router 315 may selectively discard packet 324d from queue 325. In addition, the router 315 may be configured to dynamically allocate bandwidth to queue 310 based on the available bandwidth in queue 325 after selectively discarding the data packet 324d therefrom. As such, the incoming packet 394d may be stored in queue 310 by selectively discarding one of the discard-eligible data packets 304a-304c and 324d from one of the other queues 305 and/or 325.

Although FIG. 3 illustrates an exemplary queuing system in a router according to some embodiments of the present invention, it will be understood that the present invention does is not limited to such configurations but is intended to encompass any configuration capable of carrying out the operations described herein. For example, although described above with reference to a router 315, it is to be understood that any network layer device (i.e., operating at Layer 7 of the Open Systems Interconnection (OSI) Reference Model) with similar capabilities may be configured to selectively discard data packets based on the markings thereof according to some embodiments of the present invention.

Figures 4, 5, 6:
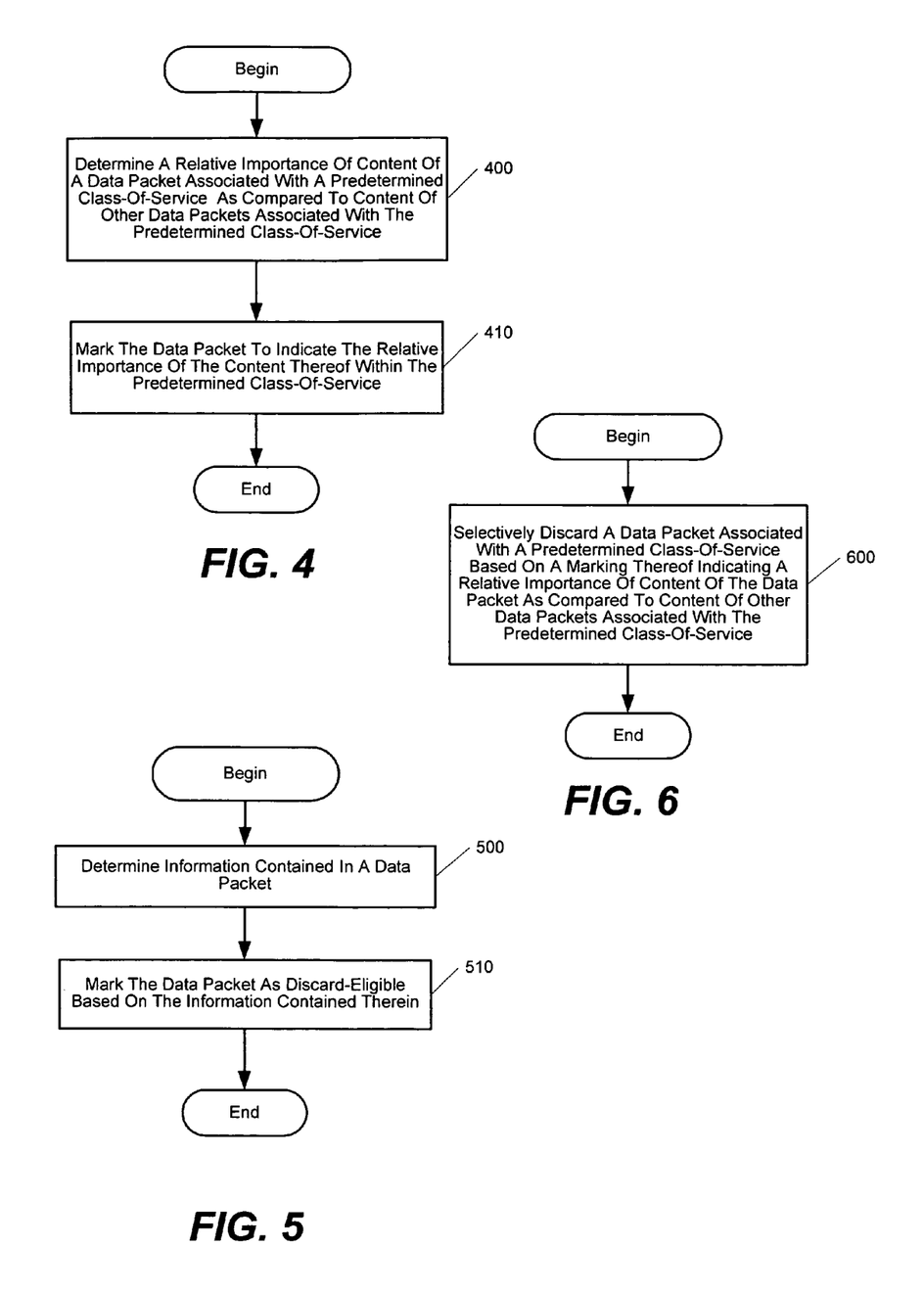
FIG. 4 is a flowchart illustrating operations for packet distribution according to some embodiments of the present invention.
FIG. 5 is a flowchart illustrating operations for packet distribution according to other embodiments of the present invention.
FIG. 6 is a flowchart illustrating operations for packet distribution according to further embodiments of the present invention.

FIG. 4 is a flowchart illustrating operations for packet distribution according to some embodiments of the present invention. These operations may be performed, for example, by the encoder 107 of FIG. 1. Referring now to FIG. 4, operations begin at Block 400 when a relative importance of content of a data packet associated with a predetermined class-of-service is determined. A class-of-service may refer to a level of priority associated with a data packet based on the particular type of data carried thereby. For example, data packets containing delay-sensitive and/or real-time data, such as streaming multimedia data and/or IP telephony data, may be associated with a higher level of service priority than data packets containing less delay-sensitive data. The relative importance of the content of the data packet may be determined as compared to content of other data packets associated with the predetermined class-of-service. For instance, some packets associated with a particular class-of-service may contain information that is more critical to a destination device for rendering and/or presenting an associated file and/or data stream than other packets. For example, in VoIP telephony services, data packets containing pauses and/or silence during a conversation may be determined to be less important than packets containing voice and/or other conversation data. In addition, the relative importance of the content of the data packet may be determined based on an amount of information and/or particular information contained therein.

Still referring to FIG. 4, the data packet is marked to indicate the relative importance of the content thereof within the predetermined class-of-service at Block 410. For example, a marker may be provided in the header section of the data packet to indicate the relative importance of the content of the payload section of the data packet relative to the content of other data packets associated with the class-of-service. In addition, the data packet may be marked as discard-eligible based on the relative importance of the content thereof, for example, when the content of the data packet is relatively unimportant for presenting the associated file/data stream at the receiver and/or when the content of the data packet may be recovered at a destination device based on other data packets associated with the file. The data packet may be marked to indicate the relative importance of the content thereof by a network device operating at the application layer (i.e., Layer 7) of the OSI Model.

FIG. 5 is a flowchart illustrating further operations for packet distribution according to further embodiments of the present invention. The operations of FIG. 5 may be performed, for example, by the encoder 207 of FIG. 2. As illustrated in FIG. 5, operations begin when the information contained in a data packet is determined at Block 500. More particularly, the information contained in the payload section of the data packet may be determined. The information may include a portion of an associated file and/or data stream. As such, based on the information contained in the data packet, the importance of the data packet to rendering the associated file and/or data stream at a destination device may be determined. For example, the importance of the data packet to the destination device may be determined based on the amount of information and/or the particular information carried by the data packet.

Moreover, the data packet may be determined to be discard-eligible based on the content thereof. In other words, it may be determined that even if the data packet is not received at a destination device, the associated file and/or data stream may still be presented by the destination device at a level of quality that may be acceptable to a user. For example, for video data, a packet carrying data corresponding to a particular picture or frame of video may be determined to be discard-eligible if the human eye may not notice that the particular frame of video is missing when the associated video stream is played back at 60 frames per second. Also, a data packet may be determined to be discard-eligible if the content of the data packet can be recovered based on other received data packets associated with the file and/or data stream. More generally, a data packet may be determined to be discard eligible when a file and/or data stream associated with the packet can be presented at a predetermined level of quality by a destination device coupled to the network even if the data packet is not received by a receiver and/or a decoder thereof.

Still referring to FIG. 5, the data packet is marked as discard-eligible based on the information contained therein at Block 510. More particularly, a marker may be provided in the header section of the packet to indicate to other network components that the information contained in the payload section of the packet to be relatively unimportant for presenting the associated file/data stream at the destination device. For example, for multi-player gaming data, a data packet containing information corresponding to the background graphics of the game may be marked as discard-eligible, as this data may be redundant to the destination device.

In addition, the data packet may be marked with a specific level of discard-eligibility based on a relative importance of the packet as compared to other data packets associated with the file and/or data stream and/or the predetermined class-of-service. For example, one discard-eligible data packet may contain information that is relatively more important to a destination device than another discard-eligible data packet, even though the destination device may be able to present the associated file and/or data stream even if neither discard eligible packet is received. In other words, the data packet may be marked as discard-eligible at Block 510 based on a determination of how important the information carried by the data packet is to reassembling/rendering a corresponding file and/or data stream at a destination device.

FIG. 6 is a flowchart illustrating operations for distributing data packets over a network according to some embodiments of the present invention. The operations of FIG. 6 may be performed by a network router, such as the routers 115a and/or 115b of FIG. 1. As illustrated in FIG. 6, a data packet associated with a particular class-of-service is selectively discarded based on a marking thereof at Block 600. The marking of the data packet indicates a relative importance of the content of the data packet to a destination device, as compared to the content of other data packets associated with the same class-of-service. For example, the data packet may be selectively discarded based on a marking in the header section of the data packet indicating that the content of the data packet is discard-eligible, i.e., based on a marking indicating that a destination device may present an associated file and/or data stream at a predetermined level of quality even if the packet is not received at the destination device. The data packet may be selectively discarded based on the marking thereof by a router, such as the router 315 of FIG. 3, or other device operating at the network layer (i.e., Layer 3) of the OSI Model during periods of high network congestion.

For example, the data packet may be selectively discarded from a queue in a router corresponding to the particular class-of-service based on the marking of the packet as compared to the markings of other data packets stored in the queue. In addition, an incoming data packet having a priority associated with a particular queue in a router may be selectively discarded, for instance, when a buffer in the corresponding queue is full.

The data packet may also be selectively discarded from one queue based on the marking of the packet as compared to the markings of data packets stored in and/or incoming to another queue. For example, when a buffer in a higher-priority queue is full, discard-eligible data packets stored in a lower-priority queue may be selectively discarded. In addition, bandwidth may be dynamically allocated to the higher-priority queue based on an available bandwidth in the lower-priority queue after selectively discarding the data packets from the lower-priority queue. As such, buffer size may be dynamically increased in one queue by selectively discarding data packets from another queue based on the markings thereof.

Moreover, the data packet may be selectively discarded at Block 600 based on the marking thereof indicating a specific level of discard-eligibility. The level of discard-eligibility may be based on a relative importance of the content of the data packet as compared to information contained in other data packets. Accordingly, when network congestion reaches a point where some packet loss may be inevitable, data packets can be selectively discarded based on their respective markings such that less important packets are preferentially dropped over packets carrying more important content.

Figure 7:
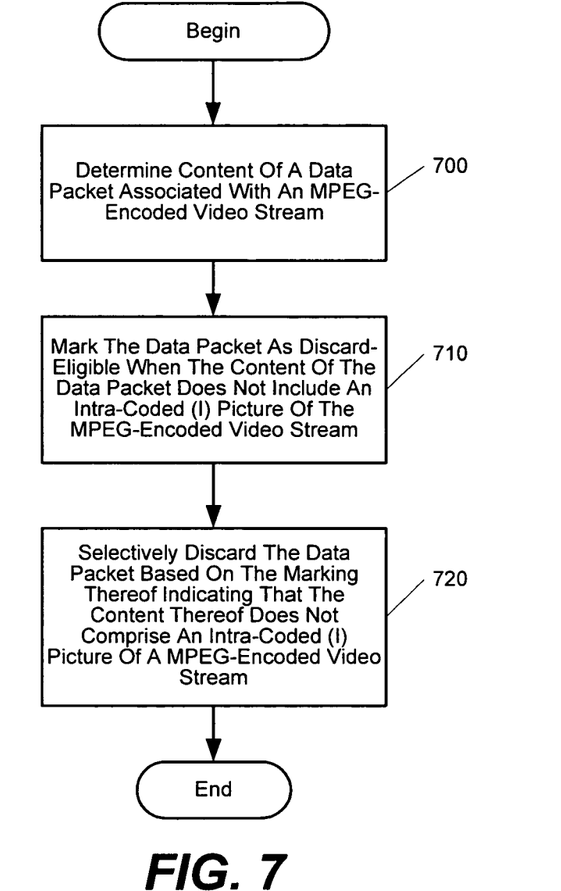
FIG. 7 is a flowchart illustrating exemplary operations for packet distribution according to still further embodiments of the present invention.

FIG. 7 is a flowchart illustrating detailed operations for packet distribution according to some embodiments of the present invention. The operations of FIG. 7 may be performed, for example, by a packet distribution system, such as the packet distribution system 100 of FIG. 1. Referring now to FIG. 7, operations begin at Block 700 when the content of a data packet associated with an MPEG-encoded video stream is determined. As discussed above, the MPEG-encoded video data may include of three types of pictures: intra-coded (I) pictures, forward-predicted (P) pictures and bi-predictive (B) pictures. One whole image can be decoded using an I-picture; however, decoding a P-picture may be dependent on the I-picture, because the P-picture includes difference data obtained from the I-picture. Similarly, decoding a B-picture may depend on both the P- and I-pictures. As such, for purposes of presenting the MPEG-encoded data stream at a destination device, packets containing I-picture information may be determined to be more important than packets containing P- and/or B-picture information.

Accordingly, still referring to FIG. 7, the data packet is marked as discard-eligible at Block 710 when the content of the data packet does not include an intra-coded (I) picture of the MPEG-encoded video stream. For example, the data packet may be marked as discard-eligible when the content of the data packet comprises a forward-predicted (P) picture and/or a bi-predictive (B) picture of the MPEG encoded video stream. In other words, as the B- and/or P-pictures contain difference data relative to an I-picture, a destination device may be able to recover the data for these pictures from a received I-picture. As such, packets containing these pictures may be marked as discard-eligible to indicate that the P- and/or B-pictures are relatively unimportant in comparison to the I-pictures of the MPEG-encoded video stream. In addition, the data packet may be marked with a specific level of discard-eligibility based on the content thereof. More particularly, a data packet including a B-picture of the MPEG encoded video stream may be marked with a higher level of discard-eligibility than a data packet including I-pictures and/or only P-pictures of the MPEG encoded video stream, as the B-pictures may be decoded based on the I- and/or P-pictures. The packet may be marked during packetization of the data stream by the encoding device. Alternatively and/or additionally, the packet may be marked during distribution by a network device that is configured to determine the content of the payload section of the packet and appropriately mark the header section of the packet.

At Block 720, the data packet is selectively discarded based on the marking thereof indicating that the content thereof does not comprise an intra-coded (I) picture of a MPEG-encoded video stream. For example, the data packet may be selectively discarded when a corresponding queue in a router is full and/or when network congestion exceeds a predetermined threshold. More particularly, the data packet may be selectively discarded when the marking thereof indicates that the content of the data packet includes a forward-predicted (P) picture and/or a bi-predictive (B) picture of the MPEG encoded video stream. In addition, the data packet may be selectively discarded based on the specific level of discard-eligibility indicated by the marking thereof. In other words, a data packet including a B-picture of the MPEG encoded video stream may be preferentially discarded rather than a data packet including P-pictures of the MPEG encoded video stream. As such, during congested network conditions, data packets containing P- and/or B-pictures may be preferentially discarded, thereby improving the likelihood that the more important I-pictures may be successfully delivered to a destination device.

The flowcharts of FIGS. 4 to 7 illustrate the architecture, functionality, and operations of embodiments of the packet distribution system 100, the encoder 207, and/or the router 315 hardware and/or software. In this regard, each block may represent a module, a segment, or a portion of code, which may comprise one or more executable instructions for implementing the specified logical functions. It should also be noted that in other implementations, the functions noted in the blocks may occur out of the order noted in FIGS. 4 to 7. For example, two blocks shown in succession may, in fact, be executed substantially concurrently, or the blocks may sometimes be executed in the reverse order, depending on the functionality involved.

Thus, some embodiments of the present invention allow prioritization of a data packet relative to other data packets associated with a predetermined class of service based on the relative importance of the content thereof to a destination device that is configured to present a file associated with the data packet. More particularly, certain packets may be marked as discard-eligible based on the relative importance of the content of the data packet. For example, in an MPEG-encoded video stream, packets containing P- and/or B-pictures may be marked as discard-eligible, as these packets may be less important than packets carrying I-pictures for rendering the video stream at a destination device. As such, discard-eligible data packets may be preferentially dropped during congested network conditions, which may allow for more efficient distribution of packetized data.

In the drawings and specification, there have been disclosed exemplary embodiments of the invention. Although specific terms are used, they are used in a generic and descriptive sense only and not for purposes of limitation, the scope of the invention being defined by the following claims.

That which is claimed:

1. A method of operating network devices for distribution of data packets over a network, the method comprising:
   detecting, based on first content of a first data packet, that a file associated with the first data packet can be presented at a predetermined level of quality by a destination device coupled to the network if the first data packet is not received by a receiver of the destination device;
   identifying the first data packet as discard-eligible based on the first content, wherein the first data packet is associated with a first class-of-service and a first priority level;
   determining a relative importance of the first content of the first data packet to presentation of the file by the destination device as compared to an importance of at least one discard-eligible data packet associated with the first class-of-service;
   marking the first data packet with one of a plurality of different levels of discard-eligibility to indicate the relative importance of the first content within the first class-of-service;
   selectively discarding the first data packet from a first queue comprising a first plurality of data packets associated with the first class-of service and the first priority level responsive to a comparison of the marking of the first data packet with a marking of a second data packet of a second queue comprising a second plurality of data packets associated with a second class-of-service and a second priority level that are not represented in the first queue, wherein the second queue does not include data packets having the first class-of-service and the first priority level; and
   dynamically increasing a buffer size allocated to the second queue for incoming data packets based on an available bandwidth in the first queue after selectively discarding the first data packet from the first queue,
   wherein the first priority level is lower than the second priority level, and
   wherein the first class-of-service is associated with packet traffic having a first delay sensitivity and the second class-of-service is associated with packet traffic having a second delay sensitivity different than the first delay sensitivity, and
   wherein the detecting, the identifying, the determining, and the marking are performed by an encoder, and wherein the selectively discarding and the dynamically increasing are performed by a router.

2. The method of claim 1, wherein the first data packet comprises a header section and a payload section, and wherein determining the relative importance of the first content of the first data packet comprises:
   determining the relative importance of the first content of the payload section of the first data packet,
   and wherein marking the first data packet comprises providing a marker in the header section of the first data packet to indicate the relative importance of the first content of the payload section within the first class-of-service.

3. The method of claim 1, wherein the file comprises a Moving Picture Experts Group-encoded video stream, and wherein identifying the first data packet as discard-eligible comprises:

identifying the first data packet as discard-eligible when the first content of the first data packet does not comprise an intra-coded picture of the Moving Picture Experts Group-encoded video stream.

4. The method of claim 3, wherein: determining the relative importance of the first content of the first data packet comprises determining whether the first data packet comprises a bi-predictive picture of the Moving Picture Experts Group-encoded video stream; and marking the first data packet with the one of the plurality of different levels of discard-eligibility comprises marking the first data packet comprising the bi-predictive picture with a higher level of discard-eligibility than a discard-eligible data packet comprising a forward-predicted picture of the Moving Picture Experts Group-encoded video stream.

5. A method of operating network devices for distribution of data packets over a network, the method comprising:

analyzing information contained in a first data packet associated with a first class-of-service, the first class-of-service comprising data packets having a first priority level, wherein the first data packet comprises a portion of an associated data stream;

determining an importance of the first data packet to rendering the associated data stream at a destination device at a predetermined level of quality based on information contained in the first data packet;

identifying the first data packet as discard-eligible based on the importance of the first data packet to rendering the associated data stream at the destination device at the predetermined level of quality;

marking the data packet with one of a plurality of different levels of discard-eligibility based on a relative importance of the information contained in the first data packet as compared to an importance of other discard-eligible data packets associated with the first class-of-service; and selectively discarding the first data packet from a first queue associated with the first class-of service responsive to a comparison of the marking of the first data packet with markings of a second data packet of a second queue, wherein the second queue is associated with a second class-of-service and a second priority level that are not represented in the first queue, and wherein the second queue is free of data packets having the first class-of-service and the first priority level; and dynamically increasing a buffer size allocated to the second queue for incoming data packets based on an available bandwidth in the first queue after selectively discarding the first data packet from the first queue, wherein the first priority level is lower than the second priority level, and wherein the first class-of-service is associated with packet traffic having a first delay sensitivity and the second class-of-service is associated with packet traffic having a second delay sensitivity different than the first delay sensitivity, and wherein the analyzing, the determining, the identifying, and the marking are performed by an encoder, and wherein the selectively discarding and the dynamically increasing are performed by a router.

6. The method of claim 5, wherein marking the first data packet as discard-eligible comprises:

determining a relative unimportance of the first data packet for rendering the associated data stream at the destination device based on the information contained in the first data packet as compared to an unimportance of other discard-eligible data packets associated with the associated data stream; and marking the first data packet with the one of a plurality of different levels of discard-eligibility to indicate the relative unimportance for rendering the associated data stream at the destination device.

* * * * *